Figure 1:
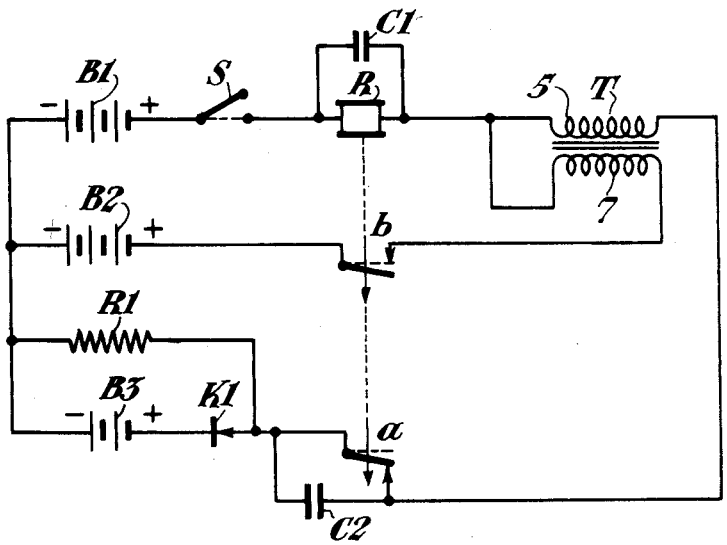

INVENTOR.
Andrew J. Sorensen.
BY
HIS ATTORNEY

Patented Nov. 21, 1950

2,530,587

UNITED STATES PATENT OFFICE 2,530,587

BATTERY CHARGING APPARATUS

Andrew J. Sorensen, Edgewood, Pa., assignor to The Union Switch & Signal Company, Swissvale, Pa., a corporation of Pennsylvania Application November 30, 1949, Serial No. 130,225

7 Claims. (Cl. 171—97)

My invention relates to battery charging apparatus, and particularly to an arrangement of battery charging apparatus for charging, from a direct current source, a battery or batteries of lower voltage than the source, and a battery or batteries of higher voltage than the source.

It has previously been proposed to charge batteries from a direct current source having a lower voltage than that of the battery to be charged by employing a "vibrator" and a step-up transformer to change the direct current to an alternating current of higher voltage, and then rectifying the high voltage alternating current and supplying it to the battery. Such arrangements are disadvantageous in a number of ways, such as, for example, comparatively short life of the vibrator contacts, necessity of providing some means of rectification, relatively large amount of driving power required for the vibrator, etc.

Accordingly, it is an object of my invention to provide a battery charging apparatus of the type described, which requires only a conventional relay or other slow operating device instead of a vibrator.

Another object of my invention is to provide battery charging apparatus of the type described which does not require the use of a rectifier to rectify the high voltage supply to the battery.

A further object of my invention is to provide apparatus of the type described in which the current for operating the relay may also be used to charge a low voltage battery.

Another object of my invention is to provide battery charging apparatus of the type described in which impulses of high voltage are supplied to the high voltage battery to be charged, superimposed on pulses of lower voltage in order to obtain a proper charging voltage.

Another object of my invention is to provide battery charging apparatus of the type described having a relay with only two moving contacts and which may be operated at a fairly slow rate, so that the erosion of the contacts and the driving power required for the relay are reduced considerably compared to that required for a vibrator type power supply.

In practicing my invention, I provide, in addition to the low voltage direct current source and the high voltage and low voltage loads, such as batteries to be charged, a transformer having two windings, and one or more contacts which are recurrently operated by an electric or electro-mechanical device such as, for example, a relay arranged to interrupt its own operating circuits so that it operates in a "door-bell" fashion, or a cam-operated contact arrangement in which the cam is driven at a constant speed by a suitable device such as a motor supplied with energy from the low voltage direct current source. In one position of the recurrently operated contact or contacts, energy is supplied through a first winding of the transformer and the low voltage battery in series. When the recurrently operated contact moves to its other position, this circuit is interrupted and a second circuit is established including a second winding of a transformer, the low voltage source, and the high voltage battery in series. The voltage induced in the second winding of the transformer by the collapse of flux due to interruption of the current in the first winding causes a high voltage impulse to be superimposed on the voltage from the low voltage source. In one form of my invention, the contacts incorporated in these circuits are shown as a part of a recurrently operated "pumping" relay, arranged to operate its contacts recurrently at a predetermined rate, and additionally, arranged to retain its contacts in one position or the other for predetermined time intervals. In a modification of my invention, the recurrently operated contacts are moved from one position to another by a cam driven by a motor.

My invention is particularly useful for charging batteries associated with portable communication equipment employed on railway trains. These portable communication equipments usually employ a relatively high voltage battery and a relatively low voltage battery to supply energy to the electron tubes employed in such equipment. By employing battery charging apparatus of the type embodying my invention, these communication equipment batteries may be charged from the batteries provided on railway vehicles for lighting purposes.

Other objects of my invention and features of novelty will be apparent from the following description taken in connection with the accompanying drawings.

I shall describe two forms of battery charging apparatus embodying my invention and shall then point out the novel features thereof in claims.

In the drawings Fig. 1 is a diagrammatic view showing an arrangement of battery charging apparatus embodying my invention and employing a "pumping" relay to recurrently open and close the circuits.

Figure 2:
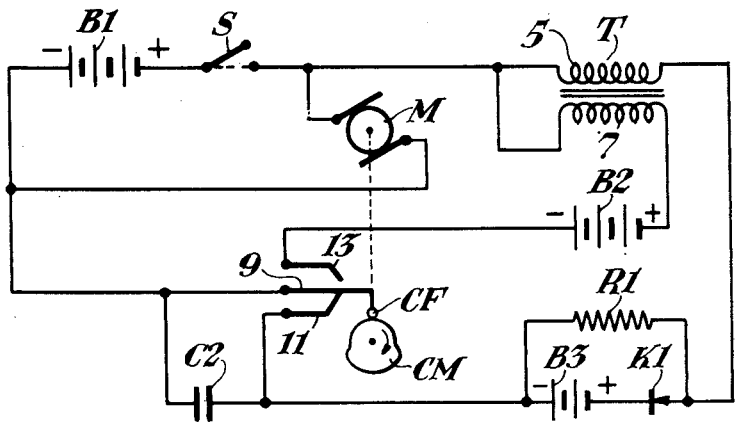

Fig. 2 is a diagrammatic view showing battery charging apparatus embodying my invention in which a motor driven cam is used to open and close the contacts employed in the circuits.

Similar reference characters refer to similar parts in each of the two views.

Referring to Fig. 1 of the drawings, there is shown therein a high voltage battery designated by the reference character B2, and a low voltage battery designated by the reference character B3, both of which are to be charged by energy supplied from a direct current source such as the battery designated by the reference character B1. The battery B1, or source of direct current for charging, is assumed to have a lower voltage than the high voltage battery B2, and a higher voltage than the low voltage battery B3. Although batteries B2 and B3 are shown as single batteries, it is apparent that other batteries may be connected in multiple with these batteries for charging, by proper proportioning of the parts. Additionally, the apparatus comprises a control switch S, a "pumping" relay R with a snubbing condenser C1 connected across its winding, a transformer T having a primary winding 5 and a secondary winding 7, a rectifier K1 in series with battery B3, a resistor R1 connected across the battery B3 and rectifier K1, and an arc-suppressing condenser C2, all as shown in the drawing.

The apparatus is shown in its normal condition with the control switch S open. When the control switch S is closed a circuit is established for supplying energy through the winding of relay R, which circuit may be traced from the positive terminal of battery B1, over the switch S in its closed position, through the winding of relay R, through the primary winding 5 of transformer T, over back contact a of relay R, at which point the current divides and a portion of the total current flows through the charge rate adjusting resistor R1, and the other portion of the current flows through the rectifier K1 to the positive terminal of battery B3, the negative terminal of which is connected to the negative terminal of battery B1, as is also the other terminal of the charging rate adjusting resistor R1. The current which flows through the circuit traced above does not immediately arrive at a steady value, due to several factors. First, the combined inductance of the primary winding 5 of transformer T and the winding of relay R is such that the current increases slowly through the winding of relay R and through the primary winding 5. This inductance serves to limit the rate of change of the current flowing through the relay winding when the circuit is closed. Second, a snubbing condenser C1 is bridged across the winding of relay R, for purposes which will be explained subsequently. At the time switch S is closed, and the circuit is first established, the condenser C1 has no charge thereon and sufficient current must flow into this condenser to charge the condenser C1 to the same value of voltage as caused by the voltage drop across the winding of relay R.

The current flows through the relay winding, the primary winding 5 of transformer T and over the back contact a of relay R and a portion thereof is supplied to the low voltage battery B3, the amount being determined by suitable proportioning of the charging rate resistor R1 which shunts the battery, so that the current supplied to battery B3 is proper for charging this battery.

When the current through the relay R reaches a sufficient value, the relay will pick up its contacts. At this time, a circuit is established for supplying energy to battery B2, which may be traced from the positive terminal of battery B1 over switch S in its closed position, through the winding of relay R, through the secondary winding 7 of the transformer T, over front contact b of relay R to the positive terminal of battery B2. The negative terminal of battery B2 is connected to the negative terminal of battery B1.

When contact a of relay R is picked up, it interrupts the circuit for supplying energy through the winding of relay R so that the flow of current through the primary winding 5 of transformer T and through the battery B3 and resistor R1 is interrupted. However, the condenser C1, which has been charged by the current which flowed previously tends to retain the relay R in its picked up position as the condenser discharges through the relay winding. Accordingly, the relay R will be slow in releasing its contacts, the time interval being determined by suitable proportioning of the condenser C1. It will be apparent that the slow releasing feature of relay R may be obtained by means other than the condenser snub shown herein, such as, for example, the use of copper ferrules on the relay core structure.

When the supply of current through the primary winding 5 of relay T is interrupted, a high voltage impulse is induced in the secondary winding 7 of this transformer. The parts are proportioned and arranged so that this impulse has a polarity such that it aids the voltage supplied from battery B1 to battery B2 over front contact b of relay R. Additionally, the parts are proportioned and arranged so that the value of this high voltage impulse which is supplied to the battery B2 is of a value suitable for charging this battery.

After a predetermined time interval, the condenser C1 will have discharged through the winding of relay R, and this relay will release. When contact b of relay R opens, the supply of energy to the battery B2 is cut off. However, the high voltage impulse will have ceased by this time. When contact a of relay R releases, it again establishes the circuit for supplying energy through the winding of relay R, the primary winding 5 of transformer T, and through the resistor R1 of battery B3. The current again commences to increase and when current of sufficient value flows through the winding of relay R, the relay will pick up again, and the cycle described above is repeated.

It will be noted that a condenser C2 is connected across the back contact a of relay R. The purpose of this condenser is to reduce the amount of sparking which takes place when contact a opens due to the relatively large amount of inductance in the circuit including the winding of relay R and the primary winding 5 of transformer T.

The rectifier or asymmetric unit K1 is provided to prevent the battery B3 from discharging through the resistor R1 during the intervals in which no energy is being supplied to battery B3. It will be apparent that the rectifier K1 is poled in such a manner that current can flow from contact a to the positive terminal of battery B3, but that current cannot flow from the positive terminal of battery B3 through the resistor R1 to the negative terminal of the battery due to the blocking effect of the rectifier. It will be obvious that in certain cases, the charging resistor R1 will not be required to adjust the charge of the low voltage battery. In such cases, both the charging resistor R1 and rectifier K1 may be eliminated from the circuit.

From the foregoing, it will be seen that my invention provides for the charging of a relatively low voltage battery by energy supplied through the transformer during the released time of the relay R, and when relay R picks up, it interrupts this circuit, and induced voltage is created in the secondary winding 7 of relay T which has sufficient value to provide a suitable charging current for the righ voltage battery B2.

Referring now to Fig. 2 of the drawings, there is shown a modification of the arrangement shown and described in Fig. 1, the modification consisting of the provision of a set of contacts operated by a motor-driven cam, rather than a "pumping" relay such as used in Fig. 1 for opening and closing the various circuits. Additionally, the circuits are rearranged somewhat so that only one operating contact for each circuit is required. In Fig. 2, when the switch S is closed, energy is continuously supplied from battery B1 to the motor M, which drives a cam CM, which in turn engages a cam follower CF which operates a movable contact 9. During one portion of the revolution of the cam CM, the movable contact 9 engages a first stationary contact 11, whereas during the other portion of each revolution of the cam CM, the movable contact 9 engages a second stationary contact 13.

During the time that movable contact 9 engages stationary contact 11, a circuit is provided for supplying energy through the primary winding 5 of transformer T to the low voltage battery B3 and the resistor R1 in multiple, which circuit is obvious from the drawing.

During the portion of the cycle in which the movable contact 9 engages the stationary contact 13, the circuit including stationary contact 11 is interrupted, and the high voltage impulse induced thereby in the secondary winding 7 of transformer T is supplied to the high voltage battery B2 over a circuit including a stationary contact 13 and movable contact 9.

As previously explained in connection with Fig. 1, the resistor R1 may be made adjustable to provide an adjustment of the charging rate of battery B3, the rectifier K1 is to prevent the loss of energy from battery B3 through the adjusting resistor R1, and the condenser C2 is an arc suppressing condenser connected across the movable contact 9 of stationary contact 11 to reduce the arcing when these contacts open the inductive circuit including the primary winding 5 of transformer T.

Although I have herein shown and described only two forms of battery charging apparatus embodying my invention, it will be apparent to those skilled in the art that various changes and modifications may be made therein within the scope of the appended claims without departing from the spirit and scope of my invention.

Having thus described my invention, what I claim is:

1. In combination, a source of direct current energy of a predetermined voltage, a first load requiring direct current energy at a substantially lower voltage than the voltage of said source, a second load requiring direct current energy at a substantially higher voltage than the voltage of said source, and means for supplying energy to said first and said second loads from said source, said means comprising a transformer having a first and a second winding, a first recurrently closed contact; a first circuit including in series said source, said first winding of the transformer, said first recurrently closed contact, and said first load; a second recurrently closed contact operated in synchronism with said first contact so that said second contact is closed each time said first contact is open; and a second circuit including in series said source, said second winding of said transformer, said second recurrently closed contact and said second load.

2. In combination, a source of direct current energy of a predetermined voltage, a first load requiring direct current energy at a substantially lower voltage than the voltage of said source, a second load requiring direct current energy at a substantially higher voltage than the voltage of said source, and means for supplying energy to said first and said second loads from said source, said means comprising a transformer having a first and a second winding, a first recurrently closed contact; a first circuit including in series said source, said first winding of the transformer, said first recurrently closed contact, and said first load; a second recurrently closed contact operated in synchronism with said first contact so that said second contact is closed each time said first contact is open; and a second circuit including in series said source, said second winding of said transformer, said second recurrently closed contact and said second load; said first and second transformer windings being selected and arranged so that the value of the voltage induced in said second winding when the current in said first winding is interrupted is equal to the voltage required by said second load.

3. In combination, a source of direct current energy of a predetermined voltage, a first load requiring direct current energy at a substantially lower voltage than the voltage of said source, a second load requiring direct current energy at a substantially higher voltage than the voltage of said source, and means for supplying energy to said first and said second loads from said source, said means comprising a transformer having a first winding and a second winding, a relay having a winding and a first and second contact, said first contact closed when the current through the winding is less than a predetermined value, and said second contact closed when the current through the relay winding exceeds said predetermined value, said relay being of the slow-to-release type; a first circuit including in series said source, the winding of said relay, said first winding of the transformer, said first contact of said relay and said first load; and a second circuit including in series said source, said relay winding, said second winding of said transformer, said second contact, and said second load; the parts being proportioned and arranged so that the current which flows in said first circuit is greater than said predetermined value, and the current which flows in said second circuit is less than said predetermined value.

4. In combination, a source of direct current energy of a predetermined voltage, a first load requiring direct current energy at a substantially lower voltage than the voltage of said source, a second load requiring direct current energy at a substantially higher voltage than the voltage of said source, and means for supplying energy to said first and said second loads from said source, said means comprising a transformer having a first winding and a second winding, a relay having a winding and a first and second contact, said first contact closed when the current through the winding is less than a predetermined value, and said second contact closed when the current through the relay winding exceeds said predeterminel value, said relay being of the slow-to-release type; a first circuit including in series said source, the winding of said relay, said first winding of the transformer, said first contact of said relay and said first load; a second circuit including in series said source, said relay winding, said second winding of said transformer, said second contact, and said second load; the parts being proportioned and arranged so that the current which flows in said first circuit is greater than said predetermined value, and the current which flows in said second circuit is less than said predetermined value, an asymmetric unit connected in series with said first load, and a resistor connected across said asymmetric unit and said first load.

5. In combination, a source of direct current energy of a predetermined voltage, a first load requiring direct current energy at a substantially lower voltage than the voltage of said source, a second load requiring direct current energy at a substantially higher voltage than the voltage of said source, and means for supplying energy to said first and said second loads from said source, said means comprising a transformer having a first and a second winding, a first circuit including in series said source, said first winding of said transformer and said first load, a second circuit including in series said source, said second winding of said transformer, and said second load, and means for alternately and recurrently closing said first and said second circuits.

6. In combination, a source of direct current energy of a predetermined voltage, a first load requiring direct current energy at a substantially lower voltage than the voltage of said source, a second load requiring direct current energy at a substantially higher voltage than the voltage of said source, and means for supplying energy to said first and said second loads from said source, said means comprising a transformer having a first and a second winding, a first circuit including in series said source, said first winding of said transformer and said first load, a second circuit including in series said source, said second winding of said transformer, and said second load, and means for alternately and recurrently closing said first and said second circuit, said means comprising a cam-operated contact arranged to close said first circuit and open said second circuit during one portion of each cycle of operation and to close said second circuit and open said first circuit during the remaining portion of each cycle of operation.

7. In combination, a source of direct current energy of a predetermined voltage, a first load requiring direct current energy at a substantially lower voltage than the voltage of said source, a second load requiring direct current energy at a substantially higher voltage than the voltage of said source, and means for supplying energy to said first and said second loads from said source, said means comprising a transformer having a first winding and a second winding, a relay having a winding and a first and second contact, said first contact closed when the current through the winding is less than a predetermined value, and said second contact closed when the current through the relay winding exceeds said predetermined value, said relay being of the slow-to-release type; a first circut including in series said source, the winding of said relay, said first winding of the transformer, said first contact of said relay and said first load; and a second circuit including in series said source, said second winding of said transformer, said second contact, and said second load; the parts being proportioned and arranged so that the current which flows in said first circuit is greater than said predetermined value, and the current which flows in said second circuit is less than said predetermined value.

ANDREW J. SORENSEN.

No references cited.